United States Patent
Iuzzolino et al.

(10) Patent No.: US 10,149,178 B2
(45) Date of Patent: *Dec. 4, 2018

(54) METHODS AND SYSTEMS FOR IMPROVING WIRELESS SIGNAL

(71) Applicant: Comcast Cable Communications, LLC, Philadelphia, PA (US)

(72) Inventors: Nicholas Iuzzolino, Milestone Township, NJ (US); Gregory Peterson, Freehold, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,535

(22) Filed: Mar. 8, 2017

(65) Prior Publication Data

US 2018/0027425 A1     Jan. 25, 2018

Related U.S. Application Data

(63) Continuation of application No. 14/816,874, filed on Aug. 3, 2015, now Pat. No. 9,629,006.

(51) Int. Cl.
*H04W 24/02* (2009.01)
*H04W 4/70* (2018.01)
*H04W 84/12* (2009.01)
*H04W 88/08* (2009.01)

(52) U.S. Cl.
CPC ............. *H04W 24/02* (2013.01); *H04W 4/70* (2018.02); *H04W 84/12* (2013.01); *H04W 88/08* (2013.01)

(58) Field of Classification Search
CPC ... H04L 1/00; H04W 4/00; H04B 1/00; H04B 2201/00; H04M 1/00; H04M 2201/00; H04Q 1/00; H04Q 2201/00
USPC ... 455/501, 456.1, 41.1–41.3, 507, 512, 513
See application file for complete search history.

(56) References Cited

U.S. PATENT DOCUMENTS

| | | | |
|---|---|---|---|
| 2007/0076650 A1* | 4/2007 | Manjeshwar | H04W 24/02 370/328 |
| 2010/0071011 A1* | 3/2010 | Addair | H04N 7/17309 725/107 |
| 2011/0035491 A1* | 2/2011 | Gelvin | H04L 67/12 709/224 |
| 2013/0208681 A1* | 8/2013 | Gore | H04B 1/7143 370/329 |
| 2014/0293899 A1* | 10/2014 | Ko | H04L 1/1812 370/329 |
| 2015/0264584 A1* | 9/2015 | Dayanandan | H01Q 3/46 455/562.1 |

* cited by examiner

Primary Examiner — Fayyaz Alam
(74) Attorney, Agent, or Firm — Ballard Spahr LLP

(57) ABSTRACT

An example method can comprise receiving a plurality of signal characteristic measurements from each of a plurality of sensors disposed at geographically distinct premises or geographically distinct locations throughout a premises. A prioritized sensor (e.g., prioritized relative to other sensors) can be determined from among the plurality of sensors, and the signal characteristic measurement from the prioritized sensor can be compared to a set of predefined signal characteristics. A network device can adjust one or more transmission characteristics based on the received signal characteristic measurements.

20 Claims, 6 Drawing Sheets

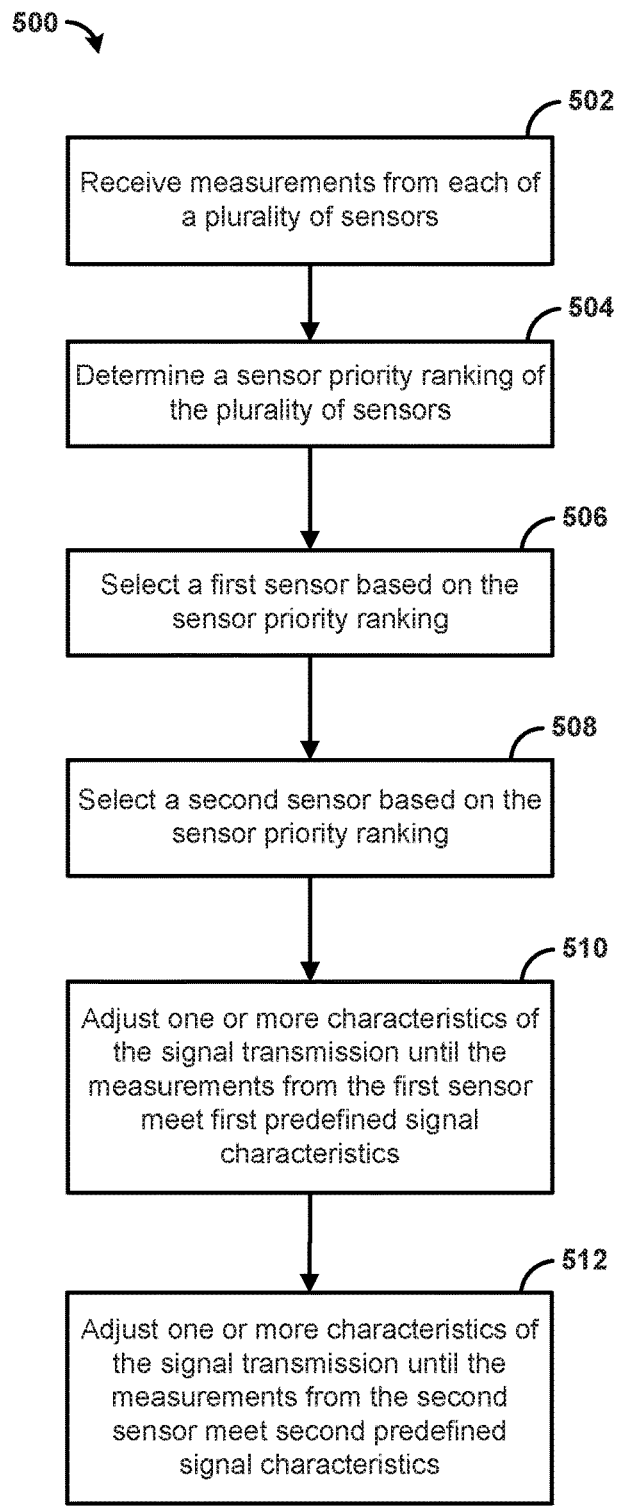

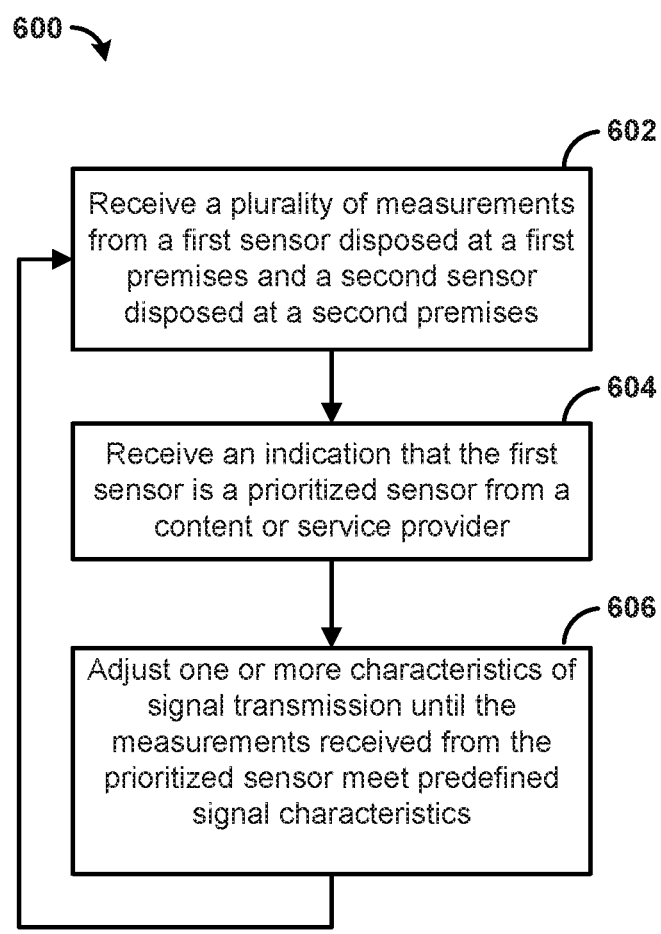

METHODS AND SYSTEMS FOR IMPROVING WIRELESS SIGNAL

CROSS REFERENCE TO RELATED PATENT APPLICATION

This application claims priority to U.S. Non-Provisional application Ser. No. 14/816,874, filed Aug. 3, 2015, which is herein incorporated by reference in its entirety.

BACKGROUND

Wireless local area network coverage within a home, multi-dwelling unit, or enterprise can be inconsistent. In particular, a wireless signal from a transmitter can vary throughout the coverage area, causing data retransmission leading to bandwidth consumption and/or poor signal strength. Typically, interference in congested signal areas can degrade a base level signal-to-noise ratio required for error free transmission and reception of the wireless signal. Conventional solutions to this include increasing transmission power. However, increasing transmission power leads to increased congestion in high traffic areas, and does not address the underlying root cause of poor signal reception. These and other shortcomings are addressed.

SUMMARY

It is to be understood that both the following general description and the following detailed description are exemplary and explanatory only and are not restrictive. In some aspects, methods and systems for adaptive control (e.g., adaptive power control) of a wireless signal are described. Sensors can be dispersed geographically throughout a dwelling or premises and can be used to measure data such as signal characteristics (e.g., a received signal strength indication (RSSI), a signal-to-noise ratio (SNR), a bit error rate, a frame error rate, etc.) at the various sensor positions and report the measurements to a wireless communication device. The wireless communication device can use the measurements received from the sensors to determine adjustments to transmission characteristics (e.g., a signal strength, a transmission channel, a signal amplitude and/or a phase, etc.) such that performance at each sensor meets established criteria (e.g., individually or relative to one or more others of the sensors). Additionally or in the alternative, a particular one of the sensors can be selected based on, for example, a user selection, a schedule, or the like, and measurements from the selected sensor can be used to adjust transmission characteristics (e.g., a signal strength, a transmission channel, a signal amplitude and/or a phase, etc.) such that performance at the selected sensor meets established criteria.

In an aspect, an example method can comprise receiving, at a network device, a plurality of signal characteristic measurements from each of a plurality of sensors disposed at geographically distinct locations throughout a premises or among more than one premises. Each of the plurality of sensors can measure one or more signal characteristics. A prioritized sensor can be determined from among the plurality of sensors, and the one or more signal characteristic measurements from the prioritized sensor can be compared to a set of predefined signal characteristics. In an aspect, priority of all sensors can be determined relative to one another. For example, characteristic measurements can be compared to verify that signal strength at the prioritized sensor meets particular criteria, and helps to ensure a strong, consistent signal at least at the prioritized sensor. The network device can adjust one or more transmission characteristics based on a difference between the received one or more signal characteristic measurements from the prioritized sensor and the set of predefined signal characteristics.

In another aspect, an example method can comprise receiving measurements from each of a plurality of sensors at a network device. The plurality of sensors can be disposed at geographically distinct locations throughout a premises or among a plurality of premises, and each of the plurality of sensors can measure signal characteristics. First predefined signal characteristics and second predefined signal characteristics can be determined. For example, a first set of characteristics can define a baseline of acceptable service within a premises, while a second set of characteristics can define an enhanced or improved level of service for a particular geographic location within the premises from which a majority of the network access and/or a particularly important portion of the network access is expected to originate. In an aspect, the first and second predefined signal characteristics can be retrieved from a service provider. In some aspects, a user can create and/or modify the first and/or second predefined signal characteristics retrieved from the service provider to better suit the user's particular premises. The network device can adjust one or more characteristics of a signal transmission until each of the plurality of sensors meets the first predefined signal characteristics. The network device can further select a first sensor of the plurality of sensors, and can adjust one or more characteristics of the signal transmission until the first sensor meets the second predefined signal characteristics.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is a flow chart illustrating another example method; and

FIG. 6 is a flow chart illustrating another example method.

DETAILED DESCRIPTION

Figure 1:
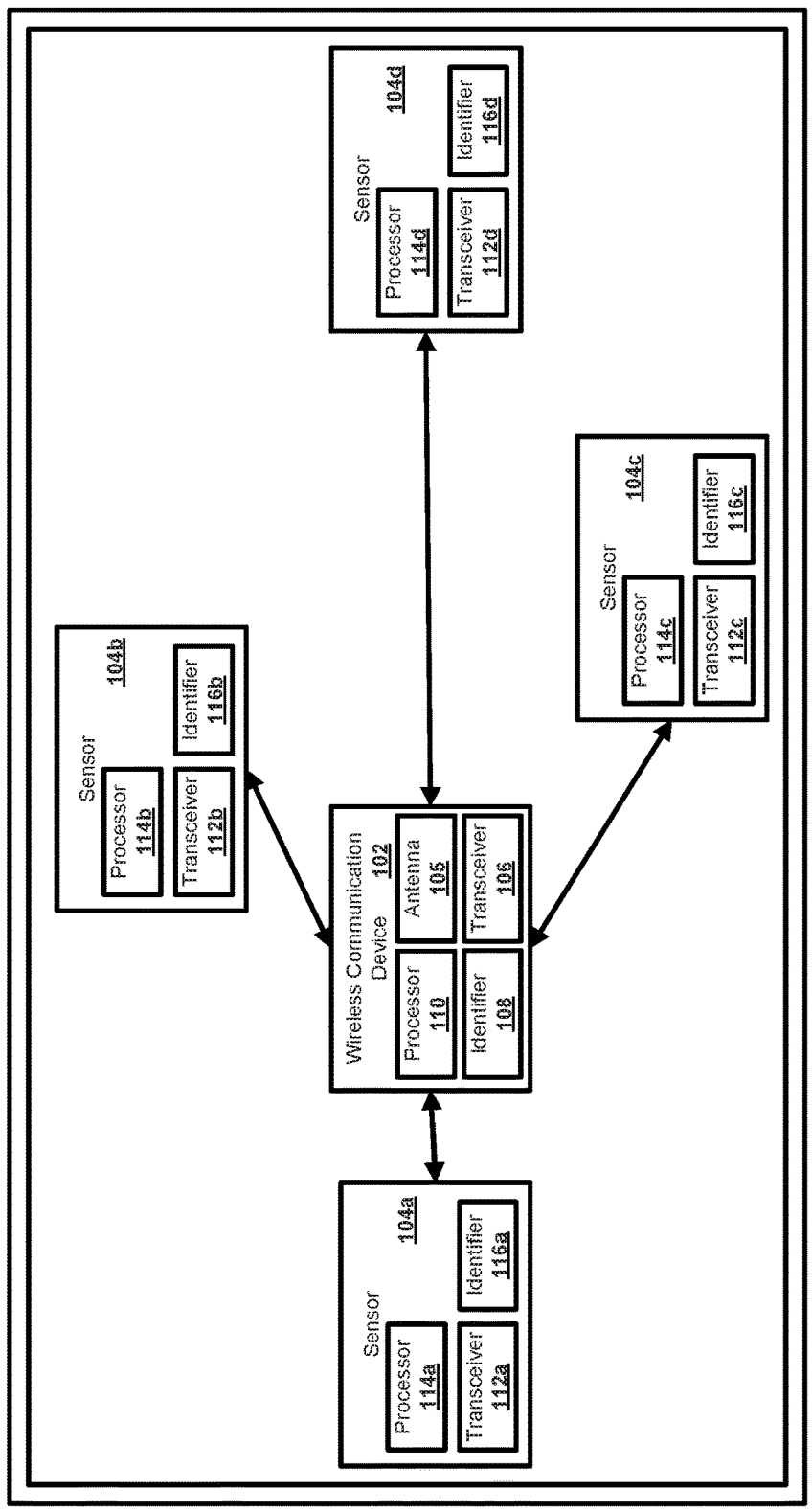
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for adaptive control of a wireless signal. Multiple sensors can be disposed geographically in and/or around a premises (e.g., a dwelling, an office building, a multi-dwelling unit, etc.). Each of the sensors can measure data that characterizes a wireless local area network signal (e.g., Wi-Fi) and report the measured data to a wireless communication device. As examples, the measured data can comprise one or more of a received signal strength indicator (RSSI), a signal to noise ratio (SNR), a bit error rate or frame error rate of a test signal, and the like. The wireless communication device can use the measured data from each of the sensors to characterize each geographic area in and/or around the premises that comprises a sensor such that performance at each user space meets or exceeds first predetermined criteria. In an aspect, the first predetermined criteria can comprise a lower bound for the RSSI, a lower bound for the SNR, a lower bound for the bit error rate or frame error rate, and the like. In another aspect, the first predetermined criteria can comprise quality of service characteristics (e.g., latency, jitter, out of order delivery, dropped packets, etc.). The first predetermined criteria can be established to help ensure that each of the wireless communication devices can provide a wireless signal sufficient for stable and relatively error-free communication to each geographic area in and/or around the premises in which a sensor has been positioned. For example, raising a signal strength may be insufficient to meet the predetermined criteria, if raising signal strength causes interference. In an aspect, the wireless communication device can use a relatively low signal strength to achieve particular performance goals (e.g., matching the first and/or second predefined criteria).

In an aspect, the methods and systems can also be used to designate a prioritized area of the premises (e.g., a particular area within sensor range of the one of the multiple sensors). The wireless communication device can use beamforming (e.g., adjusting an amplitude and/or a phase of each antenna in an antenna array of the transmitter) such that the prioritized area of the premises receives a signal that meets a second set of predefined criteria. In an aspect, the particular one of the multiple sensors can be selected based on user input. The user input can be received through an application that interfaces with the wireless communication device from a user device. In another aspect, the particular one of the multiple sensors can be selected by the wireless communication device. As an example, the wireless communication device can operate using a time-based schedule to determine the particular sensor. For example, a user may have a typical daily routine in which communication strength is desired in a first geographic location (e.g., a child's playroom) during morning hours (e.g., 9:00 am until 12:00 pm), a second geographic location (e.g., a living room) during evening hours (e.g., from 6:00 pm until 11:00 pm), and a third geographic location (e.g., a bedroom) during later hours (e.g., 11:00 pm until 1:00 am). As another example, wireless communication device can select the particular sensor based on proximity of a user device to the sensor. That is, a user may wish to have whatever sensor is nearest to his location in his home be considered the prioritized area of the premises. The user device (e.g., a smartphone, a tablet computer, a laptop computer, etc.) can use a relatively short range connection such as a personal area network (e.g., Bluetooth) to connect to one or more of the plurality of sensors. The one or more sensors can be used to determine which sensor is nearest to the user device (e.g., based on signal strength), and the nearest sensor can be determined to be the prioritized sensor.

FIG. 1 is a block diagram illustrating various aspects of an exemplary system 100 in which the present methods and systems can operate. One skilled in the art will appreciate that provided herein is a functional description and that the respective functions can be performed by software, hardware, or a combination of software and hardware.

The system 100 can comprise one or more network devices or wireless communication devices 102, such as a wireless router, a wireless switch, or a wireless access point, in communication with a plurality of sensors 104a,b,c,d. In an aspect, each sensor 104a,b,c,d can comprise a personal computer, a router, or any other device that comprises at least a wireless transceiver and a processor. In an aspect, the wireless communication device 102 can transmit a wireless signal to one or more of the sensors 104a,b,c,d. In a first aspect, the one or more sensors 104a,b,c,d can retransmit the wireless signal back to the wireless communication device 102 for analysis. In another aspect, the one or more sensors 104a,b,c,d can demodulate the wireless signal received from the wireless communication device 102, and can measure one or more properties related to the wireless signal received at the sensors 104a,b,c,d. For example, the sensors 104a,b,c,d can measure a received signal strength indicator (RSSI), a signal to noise ratio (SNR), channel interference, frequency band interference, and the like. The sensors 104a,b,c,d can then transmit the measurements to the wireless communication device 102. The sensors 104a,b,c,d can be dispersed geographically within a premises relative to the wireless communication device 102. As an example, the sensors 104a,b,c,d can be disposed in different rooms and/or on different floors of a premises, and the distance between each of the sensors 104a,b,c,d and the wireless communication device 102 can be varied. The wireless communication device 102 can optionally be in communication with a private and/or public network such as the Internet or a local area network.

In an aspect, the wireless communication device 102 can facilitate the connection of a device, such as a user device, to a network. As a further example, the wireless communication device 102 can be configured as a wireless access point (WAP). In an aspect, the wireless communication device 102 can be configured to allow one or more wireless devices to connect to a wired and/or wireless network using Wi-Fi, Bluetooth or any desired method or standard.

In an aspect, the wireless communication device 102 can be configured as part of a local area network (LAN). As an example, the wireless communication device 102 can comprise a dual band wireless access point. As an example, the wireless communication device 102 can comprise a transceiver 106, and can be configured with a first service set identifier (SSID) (e.g., associated with a public network) to function as a local network for a particular user or users. As a further example, the wireless communication device 102 can be configured with a second service set identifier (SSID) (e.g., associated with a private network or a hidden network) to communicate with the sensors 104a,b,c,d. In an aspect, the first SSID can represent a first wireless network, and the second SSID can represent a second wireless network, where the first wireless network and second wireless network use different frequencies. As an example, when the first and second networks operate on the 2.4 GHz spectrum, the first network can broadcast at 2412 MHz and the second network can broadcast at 2437 MHz. This can advantageously allow for communication in both directions between the wireless communication device 102 and the sensors 104a,b,c,d without introducing extra channel interference in the first network.

In an aspect, the wireless communication device 102 can comprise an identifier 108. As an example, one or more identifiers can be or relate to an Internet Protocol (IP) Address (e.g., IPV4 or IPV6) or a content access control address (e.g., MAC address) or the like. As a further example, the identifier 108 can be a unique identifier for facilitating communications on the physical network segment. As an example, the identifier 108 can be associated with a physical location of the wireless communication device 102.

In an aspect, the wireless communication device 102 can comprise an antenna 105 for transmitting the wireless signal. In an aspect, the antenna 105 can comprise an array of antennas, such as a phased array. One example of a phased array is a Butler matrix. The phased array can be adaptable and settable to changes based on measured properties of the wireless signal at the sensors 104a,b,c,d. The phased array can be used to alter a direction of the wireless signal relative to a face of the phased array so that relative phases of respective signals feeding each antenna in the antenna array are set in such a way that an effective radiation pattern of the antenna array is reinforced in a desired direction and/or suppressed in undesired directions.

Accordingly, adjusting power provided to the antenna 105 affects the power of the wireless signal transmitted, but produces a network footprint having a similar shape. Information received from each sensor 104a,b,c,d can also be used to adjust transmission settings affecting directionality (e.g., signal amplitude, phase, and/or timing) for each antenna within the phased array, allowing for manipulation of the shape of the network footprint. As an example, the antenna 105 can comprise a phased array of antennas, and each antenna within the phased array can have an associated transceiver 106. The wireless communication device 102 can receive and interpret information coming from the plurality of sensors 104a,b,c,d to adjust individual settings for each transceiver 106. The information received by the transceiver can comprise measurement results from one or more of the sensors 104a,b,c to be processed within the wireless communication device. The processed information can produce one or more inputs which can be used to establish appropriate individual settings for each transceiver 106 of the phased array. The array can form the desired far-field pattern providing a signal having signal characteristics that meet or exceed predefined signal characteristics. One or more settings (e.g., signal amplitude, phase and/or timing, inputs to each element (e.g., each antenna) within the phased array, and the like) can be adjusted to provide a signal having the predefined signal characteristics to each of the plurality of sensors. Each of the transceivers 106 within the phased array can be adjusted to alter a footprint of the wireless signal transmitted by the wireless communication device 102, thus changing one or more properties (e.g., RSSI, SNR, bit error rate, and/or frame error rate) of the wireless signal received at one or more of the sensors 104a,b,c,d.

In an aspect, the wireless communication device 102 can comprise a processor 110. The processor 110 can be capable of adjusting wireless transmission properties of the wireless communication device 102 to affect the characteristics of the wireless signal. As examples, the wireless communication device 102 can adjust properties such as wireless channel, transmission strength, uplink quality of service, downlink quality of service, and a service priority. In an aspect, the processor 110 can be used to optimize the signal properties. In an aspect, one or more of the sensor 104a,b,c,d can transmit a wireless signal to the wireless communication device 102. The processor 110 can be used to interpret the received wireless signal. For example, where the received wireless signal comprises a retransmission of a signal originally sent from the wireless communication device, the processor 110 can be used to measure one or more properties (e.g., RSSI, SNR, bit error rate, and/or frame error rate) of the received wireless signal. In another aspect, the received wireless signal can comprise the measured properties. Then, the processor 110 can be used to adjust one or more transmission properties of the wireless communication device 102 (e.g., signal amplitude, phase and/or timing, inputs to each element (e.g., each transceiver) within the phased array, etc.) such that the measured properties of the wireless signal transmitted from the wireless communication device are modified at the one or more sensors 104a,b,c,d.

In an aspect, each of the sensors 104a,b,c,d can connect to the first service set identifier (SSID) (e.g., associated with a public network) to receive a transmitted wireless communication signal from the wireless communication device 102 using a corresponding transceiver 112a,b,c,d. As a further example, the transceiver 112a,b,c,d can be configured to connect to the second service set identifier (SSID) (e.g., associated with the private network or the hidden network) to communicate directly with the wireless communication device 102.

In another aspect, each of the sensors 104a,b,c,d can connect to an SSID of the wireless communication device to receive a transmitted wireless signal using the transceiver 112a,b,c,d. The transceiver 112a,b,c,d can also be configured to transmit information to the wireless communication device 102 on the same SSID.

In an aspect, each sensor 104a,b,c,d can comprise a processor 114a,b,c,d for measuring various properties and/or characteristics of the wireless communication signal transmitted by the wireless communication device 102 and received through the first SSID. For example, the processor 114a,b,c,d can measure properties such as a received signal strength indicator (RSSI), a signal to noise ratio (SNR), channel interference, frequency band interference, and the like. In an aspect, a wireless communication device can transmit a particular predefined message to each sensor, and each sensor can measure a bit error rate and/or a frame error rate based on a difference between a message received at the sensor and the particular predefined message. Any signal properties that can be gathered using the transceiver 112a,b,c,d and an antenna can be measured using the processor 114a,b,c,d. In another aspect, the sensors 104a,b,c,d can retransmit the received wireless communication signal such that it will be received and measured at the wireless communication device 102.

In an aspect, each sensor 104a,b,c,d can comprise an identifier 116a,b,c,d. As an example, one or more identifiers can be or relate to an Internet Protocol (IP) Address (e.g., IPV4 or IPV6), a medium access control address (MAC address), or the like. As a further example, the identifiers 116a,b,c,d can be unique identifiers for facilitating communications on a physical network segment. In an aspect, each sensor 104a,b,c,d can comprise a distinct identifier 116a,b,c,d. As an example, the identifiers 116a,b,c,d can be associated with a physical location of the sensors 104a,b,c,d.

In an aspect, the wireless communication device 102 can receive the information from the sensors 104a,b,c,d. In an aspect, the wireless communication device 102 can select a prioritized sensor from among the sensors 104a,b,c,d. The wireless communication device can also retrieve a set of predefined signal characteristics (e.g., from the content provider). The wireless communication device 102 can adjust one or more transmission properties such that the wireless communication signal from the wireless transmission meets or exceeds the set of predefined signal characteristics when measured at the prioritized sensor. For example, the wireless communication signal can be adjusted based on a difference between the information (e.g., measured data from the prioritized sensor) and the set of predefined signal characteristics, such that the measured data at the prioritized sensor meets or exceeds the set of predefined signal characteristics.

In an aspect, the prioritized sensor can be selected based on user input. For example, a user can interface with the wireless communication device 102 via a web browser, a standalone application, or other software developed to allow communication with the network device. In an aspect, the user can access the wireless communication device 102 using software implemented on a set top box or a smart device, such as a smart TV, smartphone, or the like. The user can select a particular sensor from a list of all sensors 104a,b,c,d in communication with the wireless communication device 102. In an aspect, each sensor 104 can be identified in the list based on the corresponding identifier 116. In another aspect, the user can select a particular room within the premises and the wireless communication device 102 can select a sensor based on the sensor proximity to the selected location.

In another aspect, the prioritized sensor can be selected automatically by the wireless communication device 102. For example, the wireless communication device 102 can select the prioritized sensor based on a predefined schedule. As an example, the wireless communication device 102 can operate using a time-based schedule to determine the particular sensor. For example, a user can have a typical daily routine in which communication strength is desired in a first geographic location (e.g., a child's playroom) during morning hours (e.g., 9:00 am until 12:00 pm), a second geographic location (e.g., a living room) during evening hours (e.g., from 6:00 pm until 11:00 pm), and a third geographic location (e.g., a bedroom) during later hours (e.g., 11:00 pm until 1:00 am). The wireless communication device 102 can select a prioritized sensor from among the sensors 104a,b, c,d to complement the schedule. In another aspect, the prioritized sensor can be selected based on proximity to a user device, such as a smartphone or tablet. As an example, a user may wish to have whatever sensor 104a,b,c,d is nearest to his location in his home be considered the prioritized sensor. The user device (e.g., a smartphone, a tablet computer, a laptop computer, etc.) can use a relatively short range connection such as a personal area network (e.g., Bluetooth) to connect to one or more of the plurality of sensors. The one or more sensors 104a,b,c,d can be used to determine which sensor is nearest to the user device (e.g., based on signal strength), and the nearest sensor can be determined to be the prioritized sensor. In another aspect, the wireless communication device 102 can automatically select a prioritized sensor based on a time of day, historical usage patterns of the user, and/or geographic proximity of the user to any one of the sensors 104a,b,c,d. For example, the wireless communication device 102 can retain historical information related to usage patterns of the wireless communication device 102. For example, the historical information can comprise a timetable indicating which of the sensors 104a,b,c,d is selected as the prioritized sensor at each time of day. The wireless communication device 102 can receive indications from the one or more sensors 104a,b,c,d indicating proximity to a user device (e.g., a smartphone, a tablet computer, a laptop computer, etc.) associated with the user. The sensors 104 can use a relatively short range connection such as a personal area network (e.g., Bluetooth) to connect to one or more of the plurality of sensors. The one or more sensors can be used to determine which sensor is nearest to the user device (e.g., based on signal strength), and the nearest sensor can be determined. In an aspect, a prioritized sensor can then be determined based on one or more of the historical information and the determined nearest sensor.

In another aspect, the wireless communication device 102 can receive the information (e.g., the measured data) from the sensors 104a,b,c,d. The wireless communication device 102 can adjust one or more characteristics of a signal transmission until the measured data from each of the plurality of sensors 104a,b,c,d meet predefined signal characteristics. In an aspect, the wireless communication device 102 can use the processor 110 to alter the characteristics of the signal transmission based on the received information. For example, the processor 110 can rely on RSSI, SNR, and bit error rate to adjust the characteristics of the signal transmission. In an aspect adjusting the one or more characteristics of the signal transmission can comprise adjusting one or more of a signal strength and a transmission channel. Optionally, the wireless communication device 102 can adjust a directionality of the signal relative to a face of an antenna (e.g., the antenna 105). In an aspect, beamforming techniques can comprise adjustments to the directionality of the signal, such as adjustments to an amplitude and/or a phase of each signal sent to a phased array of antennas for transmission, so that the signals from the phased array experience constructive interference in one or more desired directions.

Figure 2:
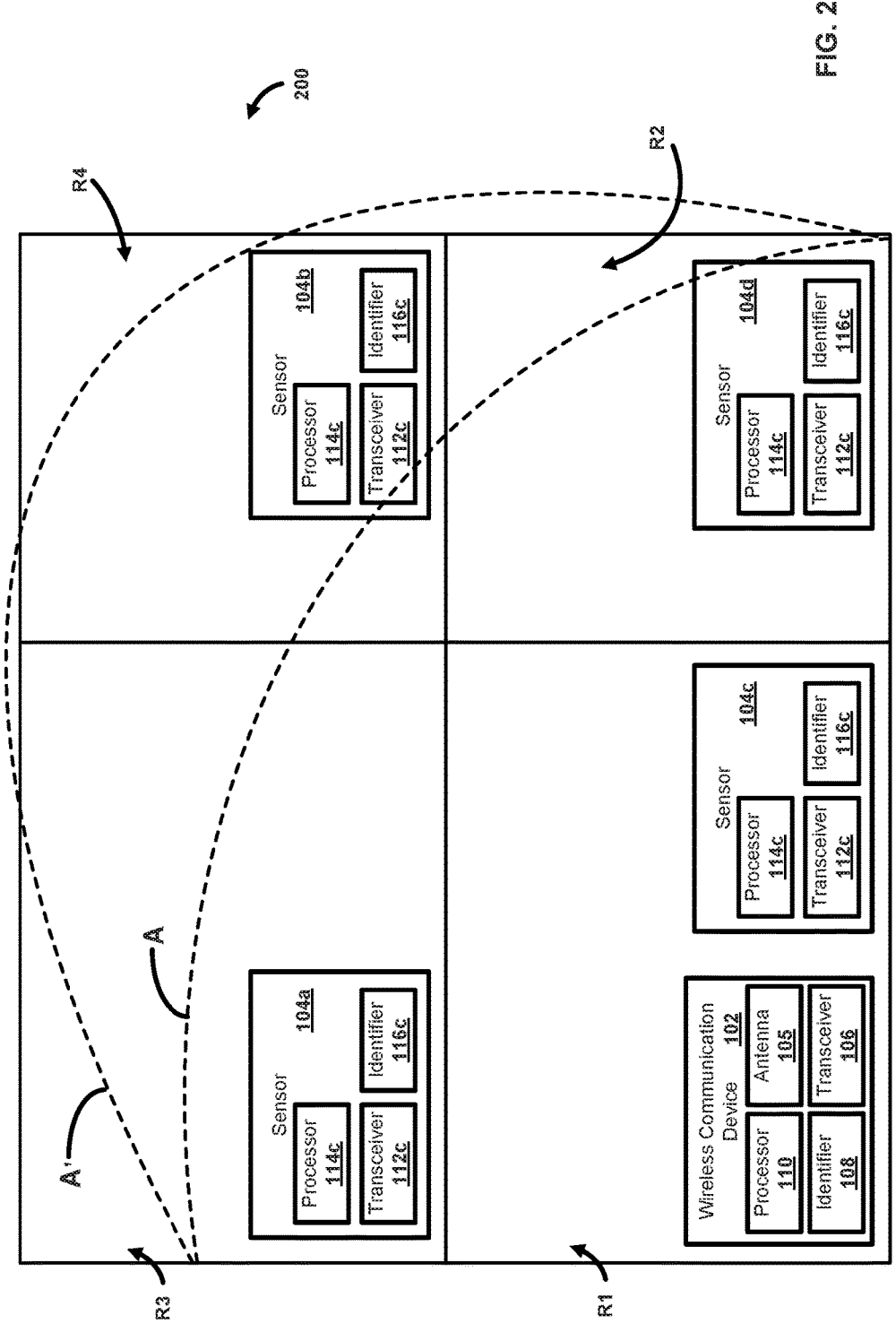
FIG. 2 is an illustration of an exemplary system deployed at a premises.

FIG. 2 shows an example system 200 deployed at a premises. In some aspects, a system can also be deployed among a plurality (e.g., a group or groups) of premises. The system 200 includes a wireless communication device 102 and four sensors 104a,b,c,d disposed at geographically distinct locations throughout the premises (e.g., the sensors 104a,b,c,d can be deployed in four separate rooms of the premises). For example, the wireless communication device 102 can be deployed in a room R1 of the premises, the sensor 104a can be deployed in room R3, the sensor 104b can be deployed in room R4, the sensor 104c can be deployed in room R1, and the sensor 104d can be deployed in room R2. In an aspect, each of the sensors 104a,b,c,d can be associated with one of the geographic locations (e.g., rooms) of the premises. For example, sensor 104a can be associated with room R3, sensor 104b can be associated with room R4, sensor 104c can be associated with room R1, and sensor 104d can be associated with room R2. The wireless communication device 102 can transmit a wireless signal to enable, support, or create a wireless network having a footprint A. In an aspect, the footprint A reflects that the wireless signal transmitted by the wireless communication device 102 does not provide coverage for the entire room R4 (e.g., signal quality is not such that it meets or exceeds predefined signal characteristics at sensor 104b).

In an aspect, the wireless communication device 102 can receive information from the sensors 104a,b,c,d. The received information can comprise measured data indicating measured properties at each of the sensors 104a,b,c,d such as a received signal strength indicator (RSSI), a signal to noise ratio (SNR), channel interference, frequency band interference, and the like. The wireless communication device 102 can adjust one or more characteristics of a signal transmission until the measured data from each of the plurality of sensors 104a,b,c,d meet the predefined signal characteristics. In an aspect, the wireless communication device 102 can use a processor 110 to alter the characteristics of the signal transmission based on the received information from each of the sensors 104a,b,c,d. For example, the processor 110 can rely on RSSI, SNR, and bit error rate to adjust the characteristics of the signal transmission. In an aspect, adjusting the one or more characteristics of the signal transmission can comprise adjusting one or more of a signal strength and a transmission channel. Optionally, the wireless communication device 102 can adjust a directionality of the signal relative to a face of an antenna (e.g., the antenna 105). In an aspect, beamforming techniques can comprise adjustments to the directionality of the signal, such as adjustments to an amplitude and/or a phase of each signal sent to a phased array of antennas for transmission so that the signals from the phased array experience constructive interference in one or more desired directions. For example, the characteristics of the signal transmission can be adjusted such that the wireless communication device 102 can transmit a wireless signal to enable, support, or create a wireless network having a modified footprint A'. Adjusting the characteristics of signal transmission can comprise adjusting a directionality such that the modified network footprint A' extends further in the direction of sensor 104b.

Figure 3:
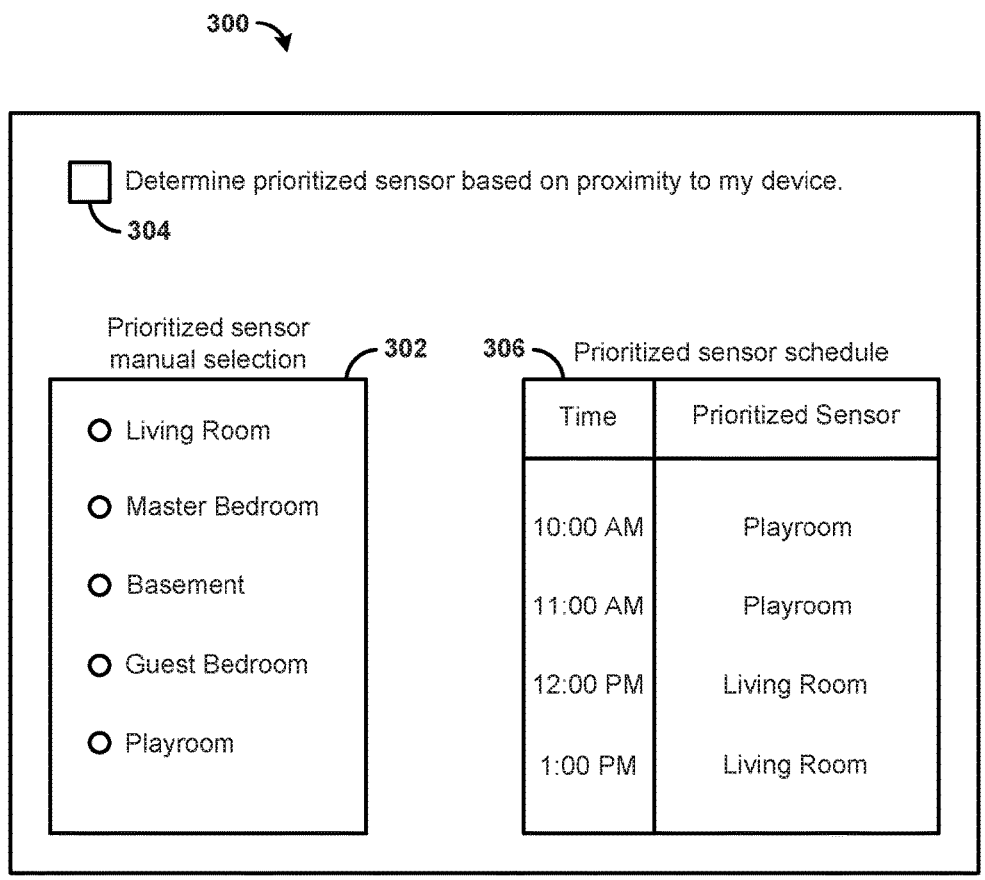
FIG. 3 is an illustration of a sample user interface for an exemplary system.

FIG. 3 shows an interface 300 for allowing user selection of a prioritized sensor. In an aspect, a user can interface with a wireless communication device (e.g., the wireless communication device 102) via a web browser, a standalone application, or other software developed to allow communication with the network device. In an aspect, the user can access the wireless communication device 102 using software implemented on, for example, a set top box or a smart device such as a smart TV, smartphone, or the like. The interface 300 can comprise a list 302 showing the sensors 104a,b,c,d. The list can comprise sensor identifying information (e.g., a MAC address) and/or a user-defined name for each sensor. In an aspect, the user can be prompted to define a name for the sensor based on its location in/around the premises (e.g., "Living Room," "Master Bedroom," etc.). In some aspects, different sensors can be associated with different premises. In an aspect, a user can select one of the sensors 104a,b,c,d from the list 302, and the selected sensor can be determined to be the prioritized sensor. While FIG. 3 shows a list 302 that comprises sensors disposed at geographically distinct locations within a premises, sensors can also be associated with different premises (e.g., user dwelling 1, user dwelling 2, etc.).

In another aspect, the interface 300 can comprise a button 304 indicating that the prioritized sensor should be determined automatically based on a user device location. In an aspect, a user device (e.g., a smartphone or tablet computer) can be designated. For example, the user device can be designated through a pairing (e.g., a Bluetooth pairing process). In an aspect, when the user selects the button 304, the prioritized device can be selected based on a proximity to the designated user device. As an example, the designated user device can use a relatively short range connection such as a personal area network (e.g., Bluetooth) to connect to one or more of the plurality of sensors. The one or more sensors can be used to determine which sensor is nearest to the user device (e.g., based on signal strength), and the nearest sensor can be determined to be the prioritized sensor.

In another aspect, the interface 300 can comprise a timeline 306. The timeline 306 can comprise time organized into blocks (e.g., hour blocks of time) and a sensor from among the plurality of sensors to be designated as the prioritized sensor during the time block stored as a time-sensor pair. In an aspect, the wireless communication device can comprise a system clock, and can select a prioritized sensor based on the time indicated by the system clock and the time-sensor pairs.

Figure 4:
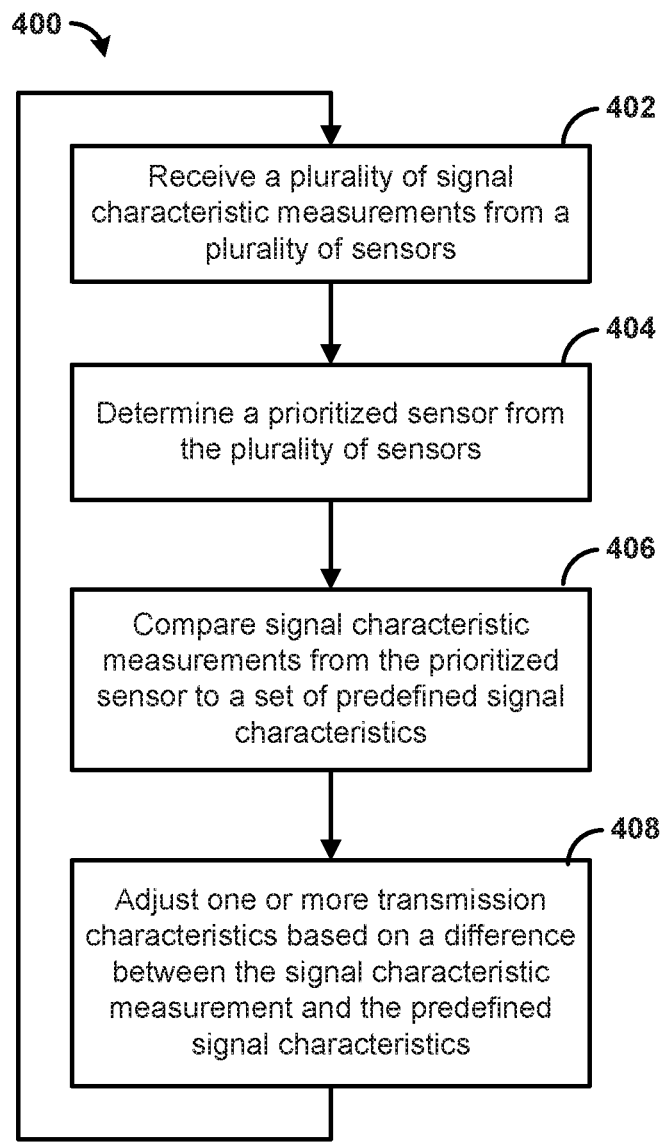
FIG. 4 is a flow chart illustrating an example method.

FIG. 4 shows an exemplary method 400. At step 402, a network device can receive a plurality of signal characteristic measurements from each of a plurality of sensors. In some aspects, a single sensor system can also be deployed. In an aspect, the network device can comprise the wireless communication device 102. In an aspect, the plurality of sensors can comprise the sensors 104a,b,c,d. In an aspect, the plurality of sensors can be disposed at and associated with geographically distinct locations. For example, the sensors can be disposed in different rooms and/or on different floors in a house, in different rooms of an office building, etc. In some aspects, the sensors can further be associated with the rooms and/or floors at which they are disposed. In some aspects, each of the geographically distinct locations can be distinct locations within a single premises. In other aspects, each of the geographically distinct locations can comprise distinct premises, and each of the distinct premises can include a network device and one or more sensors. In an aspect, each of the plurality of sensors receives one or more signals from the network device and can measure signal characteristics. For example, the plurality of sensors can measure signal characteristics including one or more of a received signal strength indicator (RSSI), a signal to noise ratio (SNR), a bit error rate, and a frame error rate. In an aspect, the sensors can also measure main channel performance, properties of the channel being utilized, and properties of adjacent channels in order to factor in potential interference considerations from other transmitters so that the network device can select an operating frequency for improved overall performance. In an aspect, one or more of the plurality of sensors 104a,b,c,d can transmit information to the network device. The information can comprise, for example, the measured signal characteristics At step 404, the network device can determine a prioritized sensor from among the plurality of sensors. In some aspects, determining the prioritized sensor can comprise selecting a sensor from among the plurality of sensors as the prioritized sensor. In other aspects, determining the prioritized sensor can comprise ranking each of the sensors relative to one another according to a priority according to a user, and selecting a sensor ranked as having the highest relative priority. In an aspect, the prioritized sensor can be selected based on user input. For example, a user can interface with the network device via a web browser, a standalone application, or other software developed to allow communication with the network device. The user can select a particular sensor from a list of all sensors in communication with the wireless communication device to be a highest priority sensor. In some aspects, the user can continue to select sensors from the list to identify additional sensors in the sensor priority ranking. In an aspect, each sensor 104 can be identified in the list based on the corresponding identifier 116. In another aspect, the user can select a particular room within the premises and the network device can select a sensor based on sensor proximity to the selected location.

In another aspect, the prioritized sensor can be determined automatically by the network device. For example, the network device can select the prioritized sensor based on a predefined schedule. As an example, the network device can operate using a time-based schedule to determine the particular sensor. For example, for a system deployed in a user's premises, a user can have a typical daily routine in which communication strength is desired in a first geographic location (e.g., a child's playroom) during morning hours (e.g., 9:00 am until 12:00 pm), a second geographic location (e.g., a living room) during evening hours (e.g., from 6:00 pm until 11:00 pm), and a third geographic location (e.g., a bedroom) during later hours (e.g., 11:00 pm until 1:00 am). Accordingly, the user can create a schedule including information regarding particular times a particular one of the plurality of sensors is to be determined to be the prioritized sensor. The network device can select a prioritized sensor from among the sensors according to the schedule. In another aspect, the prioritized sensor can be determined based on proximity to a user device, such as a smartphone or tablet. As an example, a user may wish to have whichever sensor is nearest to his location in his home be considered the prioritized sensor. The user device (e.g., a smartphone, a tablet computer, a laptop computer, etc.) can use a relatively short range connection such as a personal area network (e.g., Bluetooth) to connect to one or more of the plurality of sensors. The one or more sensors can be used to determine which sensor is nearest to the user device (e.g., based on signal strength), and the nearest sensor can be determined to be the prioritized sensor. In other aspects, the prioritized sensor can be selected based on one or more of historical usage patterns, user geographical patterns within the premises, or current user location within the premises. For example, a user device, such as a mobile phone, can be tracked within a premises, and a sensor nearest to the phone can be prioritized. As a particular example, the network device can retain historical information related to usage patterns of the network device. For example, the historical information can comprise a timetable indicating which of the sensors 104a,b,c,d is determined to be the prioritized sensor at each time of day. The wireless communication device 102 can receive indications from the one or more sensors 104a,b,c,d indicating proximity to a user device (e.g., a smartphone, a tablet computer, a laptop computer, etc.) associated with the user. The sensors 104 can use a relatively short range connection such as a personal area network (e.g., Bluetooth) to connect to one or more of the plurality of sensors. The one or more sensors can be used to determine which sensor is nearest to the user device (e.g., based on signal strength), and the nearest sensor can be determined. In an aspect, a prioritized sensor can then be determined based on one or more of the historical information and the determined nearest sensor.

At step 406, the network device can compare the received signal characteristic measurements from the prioritized sensor to a set of predefined signal characteristics. In an aspect, the predefined signal characteristics can comprise one or more of RSSI, SNR, bit error rate, and frame error rate. In an aspect, the predefined signal characteristics can be selected to enhance one or more of stability, signal strength, signal clarity, etc. For example, the predefined signal characteristics can be selected to provide an optimal or substantially optimal signal transmission to the prioritized sensor. In an aspect, the predefined signal characteristics can be retrieved from a content provider. The predefined signal characteristics can represent desired ranges for the signal characteristics (e.g., the RSSI, the SNR, the bit error rate, and the frame error rate) measured at the prioritized sensor. The predefined signal characteristics can represent values of the signal characteristics that should be measured at a location to provide a consistent and relatively error-free wireless signal at a location within a premises. In an aspect the predefined characteristics can be compared to the signal characteristics measured at the prioritized sensor and transmitted to the network device. For example, the comparison can be a simple numeric comparison to determine whether the characteristic measurements from the prioritized sensor meet or exceed the predefined characteristics.

At step 408, the network device can adjust one or more transmission characteristics of the network device based on a difference between the received characteristic measurement from the prioritized sensor and the set of predefined signal characteristics. In an aspect, the difference between the received characteristic measurement from the prioritized sensor and the set of predefined signal characteristics can be determined by subtracting a value of a received characteristic from a value of the predefined characteristic. In an aspect, the network device can alter transmission characteristics of the network device based on the received characteristic measurements. For example, the network device can rely on RSSI, SNR, and bit error rate to adjust transmission characteristics. In an aspect adjusting the one or more transmission characteristics can comprise adjusting one or more of a signal strength, a transmission channel, and a directionality of the signal relative to a face of an antenna (e.g., the antenna 105) associated with the prioritized sensor. For example, the network device can use beamforming techniques to direct the signal to the particular sensor. In an aspect, beamforming techniques can comprise adjustments to the directionality of the signal, such as adjustments to an amplitude and/or a phase of each signal sent to a phased array of antennas for transmission, such that the interference pattern created by the phased array creates constructive interference to improve signal transmission in a direction of the prioritized sensor. In an aspect, the network device can be used to set individual inputs for one or more transceivers (e.g., the transceiver 106) within a phased antenna array to adjust the beamforming properties of the transmission. These adjustments can form a desired far field pattern that can produce desired measured results from the prioritized sensor. In some aspects, the adjusted signal characteristics can be associated with an improved signal at the geographic location associated with the prioritized sensor. In some aspects, adjusting the signal characteristics can comprise causing a network device at a premises to adjust one or more signal characteristics. As a result, one premises can have signal characteristics that are different from signal characteristics at another premises.

In some aspects, the method 400 can optionally be repeated (e.g., continuously, periodically, intermittently, etc.) to receive new signal characteristic measurements and/or to determine a new sensor priority ranking of the plurality of sensors. The one or more transmission characteristics can then be re-adjusted based on new signal characteristic measurements and/or the new sensor priority ranking.

FIG. 5 shows another exemplary method 500. At step 502, a network device can receive a plurality of measurements (e.g., signal characteristic measurements) from each of a plurality of sensors. In some aspects, a single sensor system can also be deployed. In an aspect, the network device can comprise the wireless communication device 102. In an aspect, the plurality of sensors can comprise the sensors 104a,b,c,d. In an aspect, the plurality of sensors can be disposed at geographically distinct locations throughout premises. For example, the sensors can be disposed in different rooms and/or on different floors in a house, in different rooms of an office building, etc. In an aspect, each of the plurality of sensors can measure signal characteristics. For example, the plurality of sensors can measure signal characteristics including one or more of a received signal strength indicator (RSSI), a signal to noise ratio (SNR), a bit error rate, and a frame error rate. In an aspect, the plurality of sensors can measure signal characteristics on a channel in use and also on adjacent channels to report spectrum utilization back to the network device. In an aspect, one or more of the plurality of sensors 104a,b,c,d can transmit information to the network device. The information can comprise, for example, the measured signal characteristics.

At step 504, the network device can determine a sensor priority ranking of the plurality of sensors. In some aspects, the sensor priority ranking can be determined based on one or more inputs from a user. For example, a user can interface with the network device and provide one or more inputs via a web browser, a standalone application, or other software developed to allow communication with the network device. The user can determine a sensor priority ranking using a list of all sensors in communication with the network device. In an aspect, each sensor 104 can be identified in the list based on the corresponding identifier 116. In another aspect, the user can select a particular room within the premises and the network device can determine a sensor priority ranking of the plurality of sensors based on sensor proximity to the selected location. In other aspects, the sensor priority ranking can be determined based on a timetable accessible to the network device. For example, the network device can determine a sensor priority ranking based on a predefined schedule. As an example, the network device can operate using a time-based schedule to determine the sensor priority ranking. For example, a user can have a typical daily routine in which communication strength is desired in a first geographic location (e.g., a child's playroom) during morning hours (e.g., 9:00 am until 12:00 pm), a second geographic location (e.g., a living room) during evening hours (e.g., from 6:00 pm until 11:00 pm), and a third geographic location (e.g., a bedroom) during later hours (e.g., 11:00 pm until 1:00 am). Accordingly, the user can create a schedule including information regarding particular times a particular one of the plurality of sensors is important to the user, and a sensor priority ranking can be determined at one or more times based on the schedule. In still another aspect, the sensor priority ranking can be determined based on proximity to a user device, such as a smartphone or tablet. As an example, a user may wish to prioritize sensors based on a distance between a location of the user device in a home and each of the sensors. The user device (e.g., a smartphone, a tablet computer, a laptop computer, etc.) can use a relatively short range connection such as a personal area network (e.g., Bluetooth) to connect to one or more of the plurality of sensors. The network device can determine a priority ranking of the sensors based on which sensors are nearest to the user device (e.g., based on signal strength), such that the nearest sensor is determined to be the highest-priority sensor.

In other aspects, the sensor priority ranking can be determined based on the user's desired utilization habits, historical information managed by the network device (e.g., past utilization habits), and the like. As a particular example, the network device can retain historical information related to usage patterns of the network device. For example, the historical information can comprise a timetable indicating which of the sensors 104a,b,c,d is selected as the prioritized sensor at each time of day. The network device can receive indications from the one or more sensors 104a,b,c,d indicating proximity to a user device (e.g., a smartphone, a tablet computer, a laptop computer, etc.) associated with the user. The sensors 104 can use a relatively short range connection such as a personal area network (e.g., Bluetooth) to connect to one or more of the plurality of sensors. The one or more sensors can be used to determine which sensor is nearest to the user device (e.g., based on signal strength), and the nearest sensor can be determined. In an aspect, the sensor priority ranking can then be determined based on one or more of the historical information and the determined nearest sensor.

At step 506, the network device can select a first sensor of the plurality of sensors based on the sensor priority ranking determined in step 504. In an aspect, the first sensor can be a sensor determined to be a highest-priority sensor from among the plurality of sensors based on the sensor priority ranking. At step 508, the network device can select a second sensor of the plurality of sensors based on the sensor priority ranking determined in step 504. In an aspect, the second sensor can be distinct from the first sensor. In some aspects, the first sensor can be determined to have a higher priority ranking than the second sensor, based on the sensor priority ranking.

At step 510, the network device can adjust one or more characteristics of a signal transmission at the network device until the measurements from the first sensor (e.g., the signal characteristic measurements) meet first predefined signal characteristics. In an aspect, the network device can adjust transmission characteristics of the network device based on the received characteristic measurements from the one or more sensors. For example, the network device can rely on RSSI, SNR, and bit error rate to adjust transmission characteristics. In an aspect adjusting the one or more transmission characteristics can comprise adjusting one or more of a signal strength, a transmission channel. Optionally, the network device can also adjust a directionality of the signal relative to a face of an antenna (e.g., the antenna 105). In an aspect, beamforming techniques can comprise adjustments to the directionality of the signal, such as adjustments to an amplitude and/or a phase of each signal sent to a phased array of antennas for transmission, so that the signals from the phased array experience constructive interference in one or more desired directions.

In an aspect, the first predefined signal characteristics can be determined by retrieving the characteristics from a repository stored at, for example, a content provider. In an aspect, the first predefined signal characteristics can be selected to enhance one or more of stability, signal strength, signal clarity, etc. relative to one or more other sensors. For example, the first predefined signal characteristics can be selected to provide an optimal or substantially optimal signal transmission. The first predefined signal characteristics can represent desired ranges for the signal characteristics (e.g., the RSSI, the SNR, the bit error rate, and the frame error rate.) measured at one or more of the sensors.

At step 512, the network device can adjust the one or more characteristics of the signal transmission at the network device until the measurements (e.g., the signal characteristic measurements) received from the second sensor meet second predefined signal characteristics. In an aspect, the network device can adjust the characteristics of signal transmission of the network device based on the received characteristic measurements from the first device. For example, the network device can rely on RSSI, SNR, and bit error rate from the first sensor to adjust transmission characteristics. In an aspect the network device can adjust settings for one or more transceivers (e.g., the transceiver 106) that would adjust the one or more transmission characteristics. The settings can comprise adjustments to one or more of a signal strength, a transmission channel, and a directionality of the signal relative to a face of an antenna (e.g., the antenna 105) in a direction associated with the first sensor. For example, the network device can use beamforming techniques to form a desired far field pattern that can produce desired measured results from the first sensor. In an aspect, beamforming techniques can comprise adjustments to the directionality of the signal, such as adjustments to an amplitude and/or a phase of each signal sent to a phased array of antennas for transmission, such that the interference pattern created by the phased array creates constructive interference to improve signal transmission in a direction of the first sensor. In an aspect, the transmission characteristics of the network device can be adjust such that the signal measured at the first sensor meets the second predefined signal characteristics, while the signal measured at all other sensors of the plurality of sensors meet the first predefined signal characteristics.

In an aspect, the second predefined signal characteristics can be determined by retrieving the characteristics from a repository stored at, for example, a content provider. In an aspect, the second predefined signal characteristics can be selected such that the second sensor receiving a signal having the second predefined signal characteristics would be able to continuously use the signal. For example, the second predefined characteristics can create a "baseline" of usability. In an aspect, the second predefined signal characteristics can be weaker in one or more of aspects when compared to the first predefined signal characteristics. The second predefined signal characteristics can represent desired ranges for the signal characteristics (e.g., the RSSI, the SNR, the bit error rate, and the frame error rate.) measured at one or more of the sensors.

FIG. 6 shows another exemplary method 600. In step 602, a network device can receive a plurality of measurements (e.g., signal characteristic measurements) from each of a first sensor and a second sensor. In an aspect, the network device can comprise the wireless communication device 102. In an aspect, the first and second sensors can each comprise a sensor 104. In an aspect, the network device can be controlled by a content and/or service provider. In an aspect, the first sensor can be disposed at a first premises and the second sensor can be disposed at a second (e.g., geographically distinct) premises. For example, the first sensor can be disposed at a first user dwelling and the second sensor can be disposed at a second user dwelling. In other aspects the first and/or second premises can be a business, a public location, etc. In some aspects, first premises and the second premises can be associated with a single user. In other aspects, the first premises and the second premises can be associated with different users (e.g., the first premises can be associated with a first user and the second premises can be associated with a second user). In an aspect, each of the first sensor and the second sensor can measure signal characteristics. For example, the first and second sensors can measure signal characteristics including one or more of a received signal strength indicator (RSSI), a signal to noise ratio (SNR), a bit error rate, and a frame error rate. In an aspect, the first and second sensors can measure signal characteristics on a channel in use and also on adjacent channels to report spectrum utilization back to the network device. In an aspect, one or more of the first second sensors can transmit information to the network device. The information can comprise, for example, the measured signal characteristics.

In step 604, the network device can receive an indication that the first sensor is a prioritized sensor. In an aspect, the indication that the first sensor is the prioritized sensor can be received from a content or service provider. For example, the content and/or service provider can be a third part content provider. In some aspects the prioritized sensor can comprise a single sensor that is to be prioritized higher than other sensors (e.g., the second sensor). In an aspect, the first sensor can be indicated to be the prioritized sensor based on one or more of a time-based schedule (e.g., businesses are prioritized during the day, residences are prioritized in the evening), a number of devices connecting at a location (e.g., a public location can be prioritized when a large number of people are present at the location and trying to access the network), historical information (e.g., historical usage habits among the plural premises, combinations thereof, and/or other criteria.

At step 606, the network device can adjust one or more transmission characteristics of the network device based on a difference between the received characteristic measurement from the prioritized sensor and a set of predefined signal characteristics. In an aspect, the difference between the received characteristic measurement from the prioritized sensor and the set of predefined signal characteristics can be determined by subtracting a value of a received characteristic from a value of the predefined characteristic. In an aspect, the network device can adjust the one or more transmission characteristics until the received measurements from the preferred sensor meet the set of predefined signal characteristics. In an aspect, the network device can alter transmission characteristics of the network device based on the received characteristic measurements. For example, the network device can rely on RSSI, SNR, and bit error rate to adjust transmission characteristics. In an aspect adjusting the one or more transmission characteristics can comprise adjusting one or more of a signal strength, a transmission channel, and a directionality of the signal relative to a face of an antenna (e.g., the antenna 105) associated with the prioritized sensor. For example, the network device can use beamforming techniques to direct the signal to the prioritized sensor (and thus the premises at which the prioritized sensor is located). In an aspect, beamforming techniques can comprise adjustments to the directionality of the signal, such as adjustments to an amplitude and/or a phase of each signal sent to a phased array of antennas for transmission, such that the interference pattern created by the phased array creates constructive interference to improve signal transmission in a direction of the prioritized sensor. In an aspect, the network device can be used to set individual inputs for one or more transceivers (e.g., the transceiver 106) within a phased antenna array to adjust the beamforming properties of the transmission. These adjustments can form a desired far field pattern that can produce desired measured results from the prioritized sensor.

In an aspect, the predefined signal characteristics can comprise one or more of RSSI, SNR, bit error rate, and frame error rate. In an aspect, the predefined signal characteristics can be selected to enhance one or more of stability, signal strength, signal clarity, etc. For example, the predefined signal characteristics can be selected to provide an optimal or substantially optimal signal transmission to the prioritized sensor. In an aspect, the predefined signal characteristics can be retrieved from a content provider. The predefined signal characteristics can represent desired ranges for the signal characteristics (e.g., the RSSI, the SNR, the bit error rate, and the frame error rate) measured at the prioritized sensor. The predefined signal characteristics can represent values of the signal characteristics that should be measured at a premises to provide a consistent and relatively error-free wireless signal at the premises. In an aspect the predefined characteristics can be compared to the signal characteristics measured at the prioritized sensor and transmitted to the network device. For example, the comparison can be a simple numeric comparison to determine whether the characteristic measurements from the prioritized sensor meet or exceed the predefined characteristics.

In some aspects, adjusting the one or more transmission characteristics can further comprise adjusting bandwidth allocated to the premises associated with the preferred sensor (e.g., the first premises). For example, when it is determined that the bandwidth allocation for the premises associated with the preferred sensor is too low, the bandwidth allocation can be increased. In some aspects, increasing the bandwidth allocated to the premises associated with the preferred sensor can further comprise reducing bandwidth to one or more premises not associated with the preferred sensor. In an aspect, adjusting the bandwidth allocated to the premises associated with the preferred sensor can be performed based on, for example, an indication from the content and/or service provider.

In some aspects, the method 600 can optionally be repeated (e.g., continuously, periodically, etc.) to receive new signal characteristic measurements and/or a new indication of the prioritized sensor. The one or more transmission characteristics can then be re-adjusted based on new signal characteristic measurements and/or the new indication of the prioritized sensor.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, from a plurality of sensors, based on a time schedule, a prioritized sensor;
   comparing a signal characteristic measurement from the prioritized sensor to a set of predefined signal characteristics; and
   adjusting, based on a difference between the signal characteristic measurement from the prioritized sensor and the set of predefined signal characteristics, one or more transmission characteristics of a network device such that a signal provided by the network device to a location associated with the prioritized sensor is altered relative to a signal provided to another of the plurality of sensors.

2. The method of claim 1, wherein the time schedule comprises a predefined time schedule.

3. The method of claim 1, further comprising determining, based on a usage pattern associated with one or more user devices, the time schedule.

4. The method of claim 1, wherein adjusting the one or more transmission characteristics comprises adjusting one or more of a signal strength or a directionality.

5. The method of claim 4, wherein adjusting the directionality comprises adjusting one or more of a phase or an amplitude of each of a plurality of transmitting antennas.

6. The method of claim 1, wherein the plurality of sensors are disposed at, and associated with, geographically distinct locations throughout a premises.

7. The method of claim 1, further comprising receiving the set of predefined signal characteristics.

8. The method of claim 7, wherein the set of predefined signal characteristics are received from a service provider.

9. A method comprising:
   determining, from a plurality of sensors, based on a time schedule, a first prioritized sensor;
   adjusting, at a first time, one or more transmission characteristics of a network device until one or more first signal characteristic measurements made by the first prioritized sensor satisfy one or more first predefined signal characteristics;
   determining, from the plurality of sensors, based on the time schedule, a second prioritized sensor; and
   adjusting, at a second time, the one or more transmission characteristics of the network device until one or more second signal characteristic measurements made by the second prioritized sensor satisfy one or more second predefined signal characteristics.

10. The method of claim 9, wherein the one or more first signal characteristic measurements comprise one or more of a received signal strength indicator (RSSI), a signal to noise ratio (SNR), a bit error rate, or a frame error rate.

11. The method of claim 9, wherein the time schedule comprises a predefined time schedule.

12. The method of claim 9, further comprising determining, based on a usage pattern associated with one or more user devices, the time schedule.

13. The method of claim 9, wherein adjusting the one or more transmission characteristics comprises adjusting one or more of a signal strength or a directionality.

14. The method of claim 13, wherein adjusting the directionality comprises adjusting one or more of a phase or an amplitude of each of a plurality of transmitting antennas.

15. The method of claim 9, wherein the plurality of sensors are disposed at, and associated with, geographically distinct locations throughout a premises.

16. A method comprising:
    determining, based on a proximity of a user device to each of a plurality of sensors, a prioritized sensor from the plurality of sensors;
    comparing a signal characteristic measurement from the prioritized sensor to a set of predefined signal characteristics; and
    adjusting, based on a difference between the signal characteristic measurement from the prioritized sensor and the set of predefined signal characteristics, one or more transmission characteristics of a network device such that a signal provided by the network device to a location associated with the prioritized sensor is altered relative to a signal provided to another of the plurality of sensors.

17. The method of claim 16, wherein determining the prioritized sensor comprises determining, based on one or more network connections between the user device and one or more sensors of the plurality of sensors, the proximity of the user device to each of the one or more sensors of the plurality of sensors.

18. The method of claim 17, wherein determining the proximity of the user device to each of the one or more sensors of the plurality of sensors comprises determining, for each of the one or more network connections, a respective signal strength.

19. The method of claim 17, wherein the one or more network connections comprise one or more personal area network connections.

20. The method of claim 16, wherein adjusting the one or more transmission characteristics comprises adjusting one or more of a signal strength or a directionality.

* * * * *